United States Patent [19]

Eguchi et al.

[11] Patent Number: 4,672,265
[45] Date of Patent: Jun. 9, 1987

[54] ELECTROLUMINESCENT DEVICE

[75] Inventors: Ken Eguchi, Yokohama; Haruki Kawada, Kawasaki; Yukuo Nishimura, Sagamihara, all of Japan

[73] Assignee: Canon Kabushiki Kaisha, Tokyo, Japan

[21] Appl. No.: 759,967

[22] Filed: Jul. 28, 1985

[30] Foreign Application Priority Data

Jul. 31, 1984 [JP] Japan .................................. 59-158888
Jul. 31, 1984 [JP] Japan .................................. 59-158889
Jul. 31, 1984 [JP] Japan .................................. 59-158890

[51] Int. Cl.⁴ ............................................ H05B 33/14
[52] U.S. Cl. .................................... 313/504; 313/506; 427/66
[58] Field of Search .................... 313/504, 506; 427/66

[56] References Cited

U.S. PATENT DOCUMENTS 4,356,429 10/1982 Tang ................................. 313/504 X
4,539,507 9/1985 Van Slyke et al. ................. 313/504
4,542,712 9/1985 Sato et al. ................. 156/DIG. 103

OTHER PUBLICATIONS

*IBM Technical Disclosure Bulletin*, vol. 22, No. 2, Jul. 1979, pp. 826–828, Article Entitled "New Electrochemical Fluorescent Display Material with Memory", by E. M. Engler et al.
"Atoms Add Luster to Electroluminescence", by Roger Allan, *Electronics*, vol. 53, No. 12, pp. 42 & 44.

*Primary Examiner*—Palmer C. DeMeo
*Attorney, Agent, or Firm*—Fitzpatrick, Cella, Harper & Scinto

[57] ABSTRACT

An electroluminescent device comprises a double layer electroluminescent member sandwiched between a pair of electrodes. At least one layer of the two luminescent layers are constituted of a monomolecular film or a monomolecular layer built-up film comprising at least one electroluminescent organic compound which is electron-acceptable or electron-donative relative to the other luminescent layer.

28 Claims, 5 Drawing Figures

ELECTROLUMINESCENT DEVICE

BACKGROUND OF THE INVENTION

1. Field of the Invention

This invention relates to an electroluminescent device, and more particularly, to an electroluminescent device having a luminescent layer comprising two layers each of which comprises a thin film of an electroluminescent organic compound, in particular, at least one layer being a thin film of a highly ordered molecular orientation, each of the two layers is electron-acceptable or electron donative relative to the other layer.

2. Description of the Prior Art

Conventional electroluminescent devices (hereinafter sometimes referred to as "EL devices") are composed of a luminescent layer comprising a luminescent matrix of ZnS containing Mn, Cu, or $ReF_3$ (Re: rare earth ion) as an activating agent. Electroluminescent devices are generally classified into two structural types, i.e. powder type EL device and thin film type EL device based on the type of the fundamental structure of the luminescent layer.

Among practical electroluminescent devices, the thin film type EL generally exhibits a high luminance as compared with the powder type EL, but can be produced in the form of a large area element with great difficulty since the thin film type EL is fabricated such that a luminescent matrix is deposited on a substrate to form the luminescent layer, and moreover, the production cost is disadvantageously very high. Therefore, powder type EL has recently drawn attention since it is suitable for mass production and can be produced by dispersing a luminescent matrix such as ZnS in an organic binder resulting in a low production cost which is a few tens fraction of the production cost of thin film type devices.

In general, the thinner the luminescent layer, the better the luminescence characteristics, in the case of electroluminescence. However, luminescent matrix for powder type EL is discontinuous powders and when the thickness of the luminescent layer is thin, pinholes are liable to be formed in the luminescent layer and thereby it is difficult to make the layer thickness thin and satisfactory luminance characteristics can not be obtained. Japanese Patent Application Laid-open No. 172891/1983 discloses an improved electroluminescent element comprising an intermediate dielectric layer composed of a polymer of vinylidene fluoride in a luminescent layer of powder type EL. However, satisfactory luminance and desirably low power consumption have not yet been achieved.

On the other hand, there have been recently made active researches and developments that new optical and electronics materials are produced by controlling chemical structure and high order structure of organic materials. As the result, there have been proposed EC device, piezoelectric device, pyroelectric element, non-linear optical device, ferroelectric liquid crystal and the like made of organic materials which are comparable to or better than those made of metals or inorganic materials. In such a manner as above, development of functional organic materials as new functional materials surpassing inorganic materials are now demanded.

Example of devices made of organic materials are disclosed in Japanese Patent Application Laid-open No. 35587/1977, that is, EL devices produced by forming a built-up film of monomolecular layers of anthracene derivatives or pyrene derivatives having both hydrophilic and hydrophobic substituent groupings in the molecule on electrode substrates. However, such EL devices have not yet achieved a sufficient luminance and low power consumption which are necessary conditions for practical EL devices. Further, in such organic EL devices, density of carrier electron or hole is so small that excitation probability of functional molecules caused by recombination of the carriers is very low and therefore an efficient luminescence can not be expected.

SUMMARY OF THE INVENTION

An object of the present invention is to provide an EL device free from the above-mentioned drawbacks.

Another object of the present invention is to provide an EL device capable of giving luminescence of a sufficient luminance even by a low voltage drive, of low cost and capable of being easily fabricated.

According to one aspect of the present invention, there is provided an electroluminescent device which comprises a luminescent layer of a double layer structure and a pair of electrodes between which the luminescent layer is sandwiched, a first layer in the double layer structure having a monomolecular film or a monomolecular layer built-up film comprising at least one electroluminescent organic compound which is electron-acceptable relative to a second layer in the double layer structure, and the second layer having a monomolecular film or a monomolecular layer built-up film comprising at least one electroluminescent organic compound which is electron-donative relative to the first layer.

According to another aspect of the present invention, there is provided an electroluminescent device which comprises a luminescent layer of a double layer structure and a pair of electrodes between which the luminescent layer is sandwiched, a first layer in the double layer structure having a monomolecular film or a monomolecular layer built-up film comprising at least one electroluminescent organic compound which is electron-acceptable relative to a second layer in the double layer structure, and the second layer having a molecular deposited film comprising at least one electroluminescent organic compound which is electron-donative relative to the first layer.

According to a further aspect of the present invention, there is provided an electroluminescent device which comprises a luminescent layer of a double layer structure and a pair of electrodes between which the luminescent layer is sandwiched, a first layer in the double layer structure having a molecular deposited film comprising at least one electroluminescent organic compound which is electron-acceptable relative to a second layer in the double layer structure, and the second layer having a monomolecular film or a monomolecular layer built-up film comprising at least one electroluminescent organic compound which is electron-donative relative to the first layer.

DESCRIPTION OF THE PREFERRED EMBODIMENTS

Figure 1:
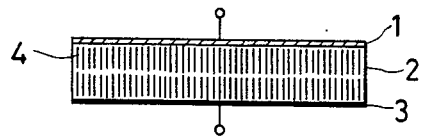
FIG. 1 schematically shows a prior art EL device produced by LB (Langmuir-Blodgett) method.

Electroluminescent organic compounds used in and featuring the present invention are organic compounds having a high luminescent quantum efficiency and $\pi$ electron system susceptible to external perturbation and capable of being excited by electric field, for example, fundamentally, fused polycyclic aromatic hydrocarbons, p-terphenyl, 2,5-diphenyloxazole, 1,4-bis(2-methylstyryl)-benzene, xanthine, coumarin, acridine, cyanine dye, benzophenone, phthalocyanine and metal complexes thereof, porphyrin and metal complexes thereof, 8hydroxyquinoline and metal complexes thereof, organic ruthenium complexes, organic rare earth complexes and derivatives of the above-mentioned compounds.

As a compound capable of being an electron acceptor or electron donor for the above-mentioned compounds, there may be mentioned heterocyclic compounds other than those mentioned above, derivatives thereof, aromatic amines, aromatic polyamines, compounds having a quinone structure, tetracyanoquinodimethane, tetracyanoethylene and the like.

In the present invention, the compounds useful for forming a luminescent layer composed of a monomolecular film or monomolecular layer built-up film may be the above-mentioned electroluminescent compounds, or compounds obtained, if desired, by chemically modifying the above-mentioned compounds according to a conventional method to give at least one hydrophobic group and at least one hydrophilic group (the "hydrophilic" and "hydrophobic" have relative meanings ).

For example, there may be mentioned the compounds of the following formula (I):

$$[(X-R_1)_m Z]_n - \phi - R_2 \quad (I)$$

where
X is hydrogen, halo, alkoxy, alkyl ether group, nitro, carboxyl, sulfonic acid group, phosphoric acid group, silicic acid group, primary, secondary or tertiary amino, metal salts thereof, primary, secondary, or tertiary amine salt, acid salts, ester group, sulfamido, amido, imino, quaternary amino, salts thereof, hydroxy or the like;
$R_1$ is $C_4$-$C_{30}$ alkyl, preferably $C_{10}$-$C_{25}$ alkyl, preferably straight chain alkyl;
m is 1 or 2;
n is an integer of 1-4;
Z is a direct bond or a bridging group such as —O—,

—CO—, —COO— and the like
($R_3$ is an optional substituent such as hydrogen, alkyl, aryl and the like); $\phi$ is a residue of electroluminescent compounds illustrated later;
$R_2$ includes hydrogen and other substituents as defined in X as above;
at least one of one or more of X, $\phi$ and $R_2$ is a hydrophilic moiety and at least one thereof is a hydrophobic moiety.

In the present invention, electroluminescent organic compounds useful for forming molecular deposited films may be selected from the above-mentioned compounds or chemically modified compounds thereof.

Preferable $\phi$ of the compounds of formula (I) used for the formation of the monomolecular film or monomolecular layer built-up film, and fundamental skeletons of the compounds used for forming the molecular deposited films may be as shown below (the $\phi$, i.e. fundamental skeleton, in the following may have an ordinary substituent such as $C_1$-$C_4$ alkyl, alkoxy, alkyl ether group, halo, nitro, primary, secondary, and tertiary amino, hydroxy, carboamido, sulfamido and the like).

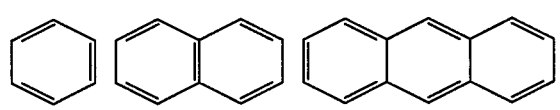

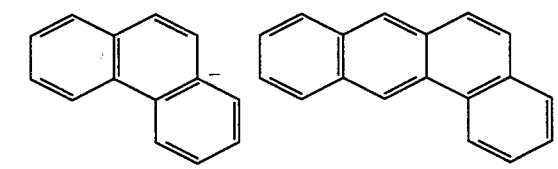

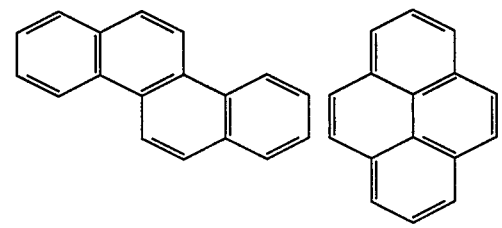

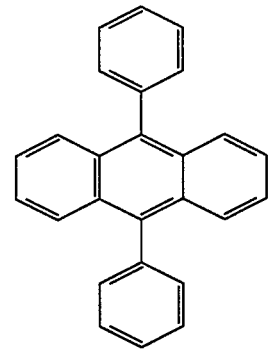

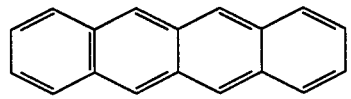

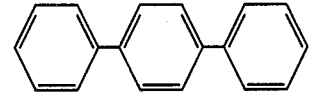

-continued

Z = NH, O, S

Z = NH, O, S

Z = NH, O, S

Z = CO, NH

Z = CO, NH, O, S

Z = S, Se

Z = S, Se

Z = CO, NH, O, S, N—ph

Z = NH, O, S
A = H, ph

Z = S, Se

Z = NH, O, S

Z = NH, O, S

Z = CO, NH, O, S

Z = NH, O, S

Z = NH, O, S

Z = NH, O, S

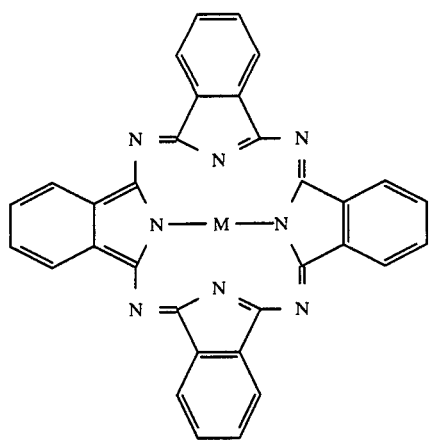
M = Mg, Zn, Sn, AlCl
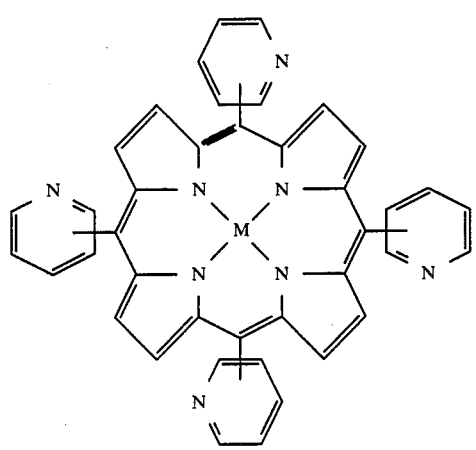
M = Hz, Be, Mg, Ca, Cd
Sn, AlCl, YbCl
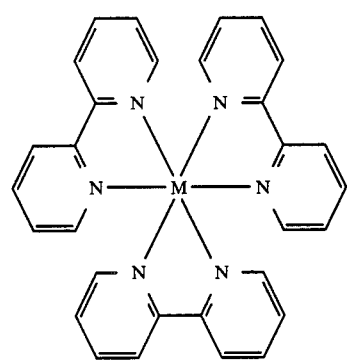
M = Er, Tm, Sm, Eu, Tb, Ru
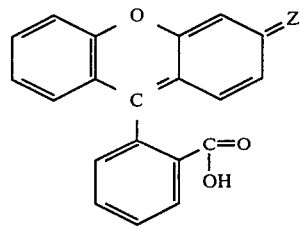
Z = O, N⊕=
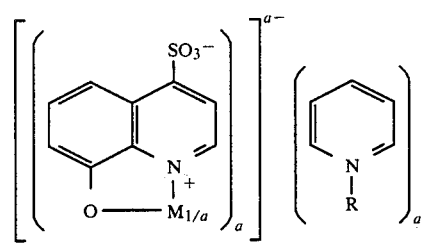
M = Al, Ga, Ir, Ta, a = 3
M = Zn, Cd, Mg, pb, a = 2
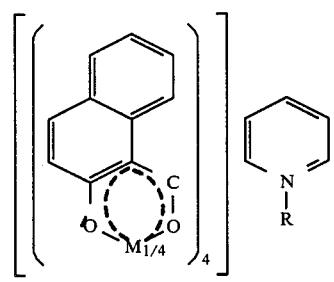
M = Er, Sm, Eu
Gd, Tb, Dy
Tm, Yb
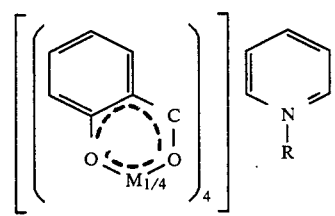
M = Er, Sm, Eu, Gd
Tb, Dy, Tm, Yb
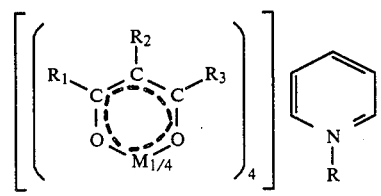
M = Er, Sm, Eu
Gd, Tb, Dy
Tm, Yb -continued

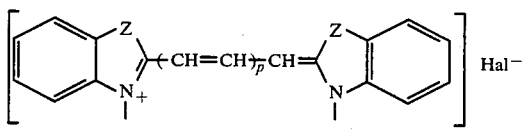

Z = O, S, Se  O ≦ p ≦ 2

The luminescent compounds as described above may be used alone or in combination, for each luminescent layer of the present invention. These compounds are preferable examples, and other derivatives or compounds may be naturally used so far as the same object is accomplished.

The present invention is characterized in using the above-described luminescent compounds as the first or the second luminescent layer of the present EL device depending on their electron acceptable or donative property. That is, since each of the above-described compounds has its own electron acceptable or donative property, one or more of the above compounds may be employed as the compound(s) forming the first luminescent layer while the above luminescent compound(s) which have different electron acceptable or donative property from that of the compound(s) employed as the first layer may be selected for the compound(s) forming the second luminescent layer. In other words, relatively electron-acceptable compound(s) may be used as the luminescent compound(s) of the first luminescent layer while relatively electron-donative compound(s) may be selected for the luminescent compound(s) of the second luminescent layer. Among such luminescent compounds, particularly preferable compounds as the electron-donative one are typically the compounds having an electron-donating group such as primary to tertiary amine groups, hydroxyl group, alkoxy groups, alkylether groups and the like, or nitrogen-containing heterocyclic compounds, and particularly preferable compounds as the electron-acceptable one are typically the compounds having an electron-attracting group such as carbonyl, sulfonyl, nitro, quaternary amino groups and the like. Luminescent compounds of this kind may be used alone or in combination for each luminescent layer of the present invention.

A pair of electrodes which are other elements constituting the EL-device of the present invention, for example, the transparent electrode layer and the back electrode layer, sandwich the luminescent layer, and conventional electrodes may be used for this purpose, and at least one of the layers must be transparent. As the transparent electrode layer, any conventional transparent electrode layers for the similar purpose may be used, and the preferable electrode is, for example, a film or sheet of transparent synthetic resins such as polymethylmethacrylate, polyester and the like, glass or the like the surface of which is coated wholly or in a patterned form with transparent electroconductive materials such as indium oxide, tin oxide, indium tin oxide (ITO) and the like. In case that an opaque electrode is used at one surface, for example, an opaque back electrode layer is used, conventional opaque electrodes may be used, and a typical and preferable one is a vapor-deposited film of aluminum, silver, gold or the like of approximately 0.1–0.3 μm thick. The shape of the transparent electrode layer or the opaque electrode layer may be optional, for example, flat-plate, belt, cylindrical or the like, and selected depending on the purpose of its use.

The thickness of the transparent electrode layer may be preferably about 0.01–0.2 μm, and a thickness less than this range may afford insufficient physical strength and electrical property while a thickness thicker than this range may spoil its transparency, lightness, miniaturization or the like.

The EL-device of the present invention is obtained by forming a luminescent layer comprising two layers with respectively using electroluminescent compounds each having their own electron acceptable or donative property, and it is characterized by that each of the two layers is a monomolecular film or a monomolecular-layer built-up film where the molecules of the formed luminescent layer with a two-layer structure are arrayed with highly ordered molecular orientation, by that the first layer constituting the formed luminescent layer with a two-layer structure is a monomolecular film or a monomolecular-layer built-up film containing electron-acceptable compounds relative to the second layer the molecules of which are arrayed with highly ordered molecular orientation while the second layer is a molecular vapor-deposited film containing electron-donative compounds relative to the first layer, or by that the first layer constituting the formed luminescent layer with a two-layer structure is a molecular vapor-deposited film containing electron-acceptable compounds relative to the second layer while the second layer is a monomolecular film or a monomolecular-layer built-up film containing electron-donative compounds relative to the first layer the molecules of which are arrayed with highly ordered molecular orientation.

A particularly preferable method of forming the monomolecular film or the monomolecular-layer built-up film is Langmuir-Blodgett's technique (LB process). The LB process is a method for forming a monomolecular layer or a monomolecular-layer built-up film by utilizing such a phenomenon that when the balance between the hydrophilic and the hydrophobic groups (the balance of the two affinities for solvent) is properly maintained in a molecule having the above two kinds of groups, the molecules form a monomolecular layer on water surface with the hydrophilic groups downward. In practice, a partition plate (or float) is provided so that the molecules spreading on the water surface may not be freely and too widely diffused, and the aggregation state of the film-forming material is controlled by restricting the spread area. A surface pressure suitable for formation of a monomolecular film or a monomolecular-layer built-up film then can be set by gradually increasing the surface pressure. By gently moving the substrate vertically (upwardly or downwardly) while maintaining this surface pressure, a monomolecular layer can be transferred onto the substrate. A monomolecular film can be formed by following the above procedure, and a monomolecular-layer built-up film can be formed as a built-up film with a desired degree of accumulation by repeating the above procedure.

The monomolecular film can be transferred onto the substrate not only by the above-described vertical dipping technique but also by horizontal deposition technique, by rotary cylinder technique or the like. The horizontal deposition technique is a method for transfer by horizontally contacting a substrate with the water surface, whereas the rotary cylinder technique is a method for transferring the monomolecular layer onto the surface of a cylindrical substrate from the water surface by rotating the cylindrical substrate on the water surface. In the case of the above-described vertical dipping technique, a substrate whose surface is hydrophilic is pulled up from the water across the water surface, and then a monomolecular film in which the hydrophilic groups of the molecules are oriented toward the substrate is formed on the substrate. Monomolecular layers are accumulated one at a time by moving the substrate vertically as described above. Since the orientation of the film-forming molecules is reversed between pulling-up and dipping process, a Y-type film is formed, where hydrophilic groups of the molecules confront hydrophilic groups and hydrophobic groups of the molecules confront hydrophobic groups at the boundaries of the layers. On the other hand, the horizontal deposition technique is a method for transfer by horizontally contacting a substrate with the water surface, and a monomolecular film in which the hydrophobic groups of the molecules are oriented toward the substrate is formed on the substrate. In the case of this method, since the alternation of the orientation of the film-forming molecules does not occur at the accumulation of monomolecular layers, an X-type film is formed at every layer, where hydrophobic groups are oriented toward the substrate. To the contrary, a build-up film where hydrophilic groups are oriented toward the substrate at every layer is referred to a Z-type film. The rotary cylinder technique is the method of transferring a monomolecular layer onto the surface of a cylindrical substrate by rotating the cylindrical substrate on the water surface. Technique for transferring a monomolecular layer onto a substrate is not limited to these techniques. That is, in the case of using a substrate of large area, for example, the substrate can be pushed out into water from a substrate roll. In addition, said orientations of the hydrophilic groups or the hydrophobic groups toward the substrate are basic orientations, and can be changed, as desired, by surface treatment of the substrate or the like.

Particularly preferable methods for forming a molecular deposited film constituting the luminescent layer of the present invention are the resistance-heating deposition technique and the CVD technique, and, for example, in the case of the deposition technique, a thin layer of approximately 500 Å thick can be formed as the luminescent layer.

For example, in the case of the resistanceheating deposition technique, the material is put onto a tungsten boat placed in a vacuum chamber, kept more than 30 cm apart from the substrate, heated by resistance-heating, and deposited by setting the temperature at its sublimation point if it has a sublimation tendency or above its melting point if it has a melting tendency. By setting the pressure at $2 \times 10^{-6}$ Torr or less, the boat is screened by closing a shutter, heated for two or so minutes for preliminary emitting, and the shutter is then opened for deposition.

The deposition speed, which is measured by a layer-thickness monitor using crystal resonator during the deposition step, is preferably 0.1 Å/sec-100 Å/sec. During this step, the pressure is maintained below $10^{-3}$ Torr, preferably about $10^{-5}$ Torr for avoiding oxidation.

The EL-device of the present invention is obtained by forming a two-layered structure of the above described materials for forming a luminescent layer, as described above, between a pair of electrodes with compounds having different electron acceptable or donative properties for each by, preferably, the above-described LB-technique. Also, the EL-device of the present invention is obtained by forming a two-layered structure luminescent layer where a monomolecular film or a monomolecular-layer built-up film is formed as the first layer (the layer facing the transparent electrode layer) with relatively electron-acceptable compounds selected from the above-mentioned compounds by, for example, the LB-technique and a molecular vapor-deposited film is formed as the second layer (the layer facing the back electrode layer) with relatively electron-donative compounds selected from the above-mentioned compounds. Furthermore, the EL-device of the present invention is obtained by forming a two-layered-structure luminescent layer where a molecular vapor-deposited film is formed as the first layer (the layer facing the transparent electrode layer) with relatively electron-acceptable compounds selected from the above-mentioned compounds and a monomolecular film or a monomolecular-layer built-up film is formed as the second layer (the layer facing the back electrode layer) with relatively electron-donative compounds selected from the above-mentioned compounds by, for example, the LB-technique.

Although forming an EL-device by the LB-technique is known in the art, an EL-device having sufficient performance can not be obtained by said known process. As the result of a wide variety of research, it has been found that the performance of the EL-device is remarkably improved by forming a two-layered structure luminescent layer where each layer is formed as a monomolecular film or a monomolecular-layer built-up film with compounds having different electron acceptable or donative properties from each other as described above, in particular, by forming the first layer of the luminescent layer as a monomolecular film or a monomolecular-layer built-up film with relatively electron-acceptable compounds as described above and forming the second layer as a molecular vapor-deposited film with compounds electron-donative relative to the first layer, or further by forming the first layer as a molecular vapor-deposited film with relatively electron-acceptable compounds as described above and forming the second layer as a monomolecular film or a monomolecular-layer built-up film with compounds electron-donative relative to the first layer.

In a first embodiment of the present invention, each luminescent layer is a monomolecular film composed of the above-mentioned luminescent material.

The EL device in this embodiment is fabricated by the following procedure. First, a material electron-acceptable relative to the other layer is dissolved in a suitable organic solvent such as chloroform, dichloromethane, dichloroethane and the like to a concentration of about $10^{-4}$–$10^{-2}$ M. This solution is spread on the surface of water having suitable pH (e.g. pH of about 1-8) which may contain a variety of metal ions to form the monomolecular film by removing the solvent by evaporation. Using the LB method described above, a first layer is formed on one electrode substrate and dried fully. Then, a monomolecular film composed of a material electron-donative relative to the thus formed first layer is similarly formed on the first luminescent layer. Next, an electrode material such as aluminium, silver, gold and the like is preferably deposited on the second layer by means of vapor deposition or the like to form a back electrode layer. The thickness of the luminescent layer comprising the two monomolecular layers of the resulting EL device varies depending on the kind of materials used, but is generally about 0.01-1 μm.

In a second embodiment, at least one, preferably both of the two layers constituting the luminescent layer of the EL device of the present invention is composed of a built-up film of the above monomolecular film formed by the LB method. The built-up film is formed by building up the monomolecular film to its required number following the various procedures.

The built-up number of the monomolecular films in the luminescent layer of the resulting EL device can be optionally altered. In the present invention, the build-up number of monomolecular films is about 2-400, preferably about 4-400, in total number of the two layers.

In a third embodiment of the present invention, a first luminescent layer is a monomolecular film composed of the above-mentioned luminescent material. EL device in this embodiment is fabricated by the following procedure. First, a material electron-acceptable relative to a second layer is dissolved in a suitable organic solvent such as chloroform, dichloromethane, dichloroethane, and the like to a concentration of about $10^{-4}$-$10^{-2}$M. This solution is spread on the surface of water having suitable pH (e.g. pH of about 1-8) which may contain a variety of metal ions to form the monomolecular film by removing the solvent by evaporation. Using the LB method described above, the first layer is formed on one transparent electrode substrate and dried fully. Then, a deposited layer as a second layer is formed on the first layer with a material electron-donative relative to the first layer by the molecular deposition method described above. Next, an electrode material such as aluminium, silver, gold and the like is preferably deposited on the second layer by means of vapor deposition or the like to form a back electrode layer. A thickness of the luminescent layer comprising the two layers of the resulting EL device varies depending on the kind of materials used, but is generally about 0.01-1 μm.

In a fourth embodiment, the first layer belonging to the luminescent layer of the EL device of the present invention is a built-up film of the monomolecular film described above formed by the LB method. The first layer is formed by building up the above monomolecular film to its required number following the various procedures and the second layer is formed on the first layer as described above. A thickness of the luminescent layer of the resulting EL device of the present invention can be optionally altered. In the present invention, it is desired that the built-up number of monomolecular films in the first layer is 1-200, preferably about 4-200, the thickness of the second layer is about 0.01-0.5 μm, and the total thickness of the luminescent layer is about 0.02-1 μm.

In the EL device of the present invention as described above, the luminescent layer is a super-thin film, the first layer has high molecular regularity and high performance required for working the EL device, and the second layer and the first layer exhibit excellent luminescent performance by various interactions between these layers.

In a fifth embodiment of the present invention, the second luminescent layer is a monomolecular film composed of the above-mentioned luminescent material. E device in this embodiment is fabricated by the following procedure. First, a deposited layer as a first layer is formed with a material electron-acceptable relative to the second layer by the molecular deposition method described above. Then, a material electron-donative relative to the thus formed first layer is dissolved in a suitable organic solvent such as chloroform, dichloromethane, dichloroethane and the like to a concentration of about $10^{-4}$-$10^{-2}$M. This solution is spread on the surface of water having suitable pH (e.g. pH of about 1-8) which may contain a variety of metal ions to form the monomolecular film by removing the solvent by evaporation. Using the LB method described above, the second layer is formed on one electrode substrate and dried fully. Next, an electrode material such as aluminium, silver, gold and the like is preferably deposited on the second layer by means of vapor deposition or the like to form a back electrode layer.

The thickness of the luminescent layer comprising the two layers of the resulting EL device varies depending on a kind of materials used, but is generally about 0.01-1 μm.

In a sixth embodiment, the second layer belonging to the luminescent layer of the EL device of the present invention is a built-up film of the monomolecular film described above formed by the LB method. The second layer is formed on the above first layer by building up the monomolecular film to its required number following the various procedures. The thickness of the luminescent layer of the resulting EL device of the present invention can be optionally altered. In the present invention, it is desired that the built-up number of monomolecular films in the second layer is 1-200, preferably about 4-200, the thickness of the first layer is about 0.01-0.5 μm, and the total thickness of the luminescent layer is about 0.02-1 μm.

In the EL device of the present invention as described above, the luminescent layer is a super-thin film, the second layer has high molecular regularity and high performance required for working the EL device, and the first layer and the second layer exhibit excellent luminescent performance by various electrical interactions between those layers.

Figure 2:
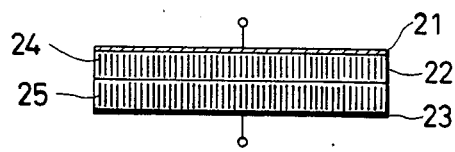
FIG. 2, FIG. 3 and FIG. 4 schematically show EL devices according to the present invention prepared by the methods of Examples 1a, 1b and 1c, respectively.
Figure 3:
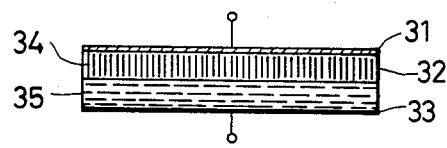
Figure 4:
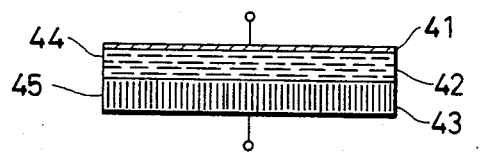

Further, as shown schematically in FIG. 1, the luminescent layer of the EL device of the present invention differs from a luminescent layer comprising a single layer of the prior art. And as shown schematically in FIGS. 2, 3 and 4, since the interface of the first layer and the second layer is uniform, various interactions between the two layers having respective different electron acceptable or donative property occur very easily, thereby exhibiting excellent luminescent performance which is not achieved by the prior art.

By altering variously the difference in electronegativity between the first luminescent layer and the second luminescent layer, luminescent intensity can be improved and luminescent color can be optionally altered, or the life for the use can be remarkably extended.

In FIGS. 1-5, 1, 21, 31, 41 and 51 are transparent electrodes;
2, 22, 32, 42 and 52 are luminescent layers;
4, 24, 25, 34 and 45 are monomolecular films or the monomolecular built-up films;
35 and 44 are molecular-deposited films;
56 is a seal glass;
57 is an insulating silicone oil; and
58 is a glass plate.

The luminescent layer adheres strongly to the one electrode or both of the electrodes by the LB method and the molecular deposition method, thereby not generating peel-off of the luminescent layer. Also, strengthening adhesion force can be accomplished by treating preliminarily the substrate surface or providing a suitable adhesive layer between the substrate and the luminescent layer. In the LB method, adhesion force can be strengthened by selecting a suitable kind of materials for forming the luminescent layer and controlling various conditions such as pH of water, ion species in water, water temperature, transferring rate of the monomolecular film, surface pressure of the monomolecular film or the like.

Since performance of the thus formed EL device in just the state may be degraded by influence of moisture and oxygen in air, it is desired to make a moisture- and oxygen-resistance sealed-up structure.

In the prior art, a material which has an excellent luminescent property, but insufficient film-forming property and film strength can not be used.

On the contrary, according to the present invention, in the case where a material which has poor film-forming property and film strength, but excellent luminescent property is used, the luminescent layer excellent in all of the luminescent property, film-forming property and film strength can be obtained by using a material excellent in the film-forming property for composing one of the two layers.

The EL device as described above of the present invention exhibits excellent EL luminescence by applying electrical energy such as an alternating current, a pulse, a direct current and the like between the electrodes so that an electric field or the like occurs suitably in the luminescent layer.

The present invention is concretely described by referring to the following Examples. In the Examples, parts are by weight.

EXAMPLE 1a

A transparent electrode was formed by vapor-depositing an ITO layer of 1500 Å thick on a glass plate of 50 mm square according to a sputtering method. After the resulting substrate was cleaned sufficiently, it was dipped into an aqueous phase (pH 6.5) in Langmuir-Trough 4 (tradename, produced by Joyce-Loebel Co. Ltd.) in which a concentration of cadmium chloride was $4 \times 10^{-4}$M.

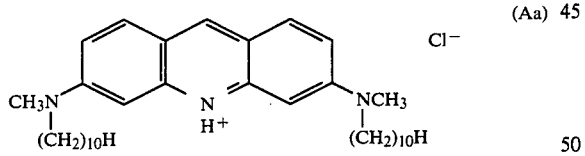

The above compound (Aa) was dissolved in chloroform ($10^{-3}$mol/l), and the solution was spread on the surface of the aqueous phase described above.

After removal of chloroform by evaporation, the surface pressure was raised to 30 dynes/cm, and the monomolecular film of the above-mentioned colouring compound was formed. Then, while keeping the surface pressure constant, the substrate was carefully immersed and pulled up (a rate of moving vertically was 2 cm/min.) at right angle to the surface of the aqueous phase, and whereby the monomolecular film of the colouring compound was transferred on the substrate. By repeating the operation, a monomolecular film alone and monomolecular built-up films of 5, 10 and 15 layers were formed, respectively.

In this building up step, the substrate, after each uptake from the aqueous phase, was allowed to stand for 30 minutes or more to remove the adherent water therefrom by evaporation.

Next, the monomolecular film remaining on the surface of the aqueous phase was removed completely, and pyrene derivative (Ba) which was newly dissolved in chloroform was spread onto the surface of the aqueous phase.

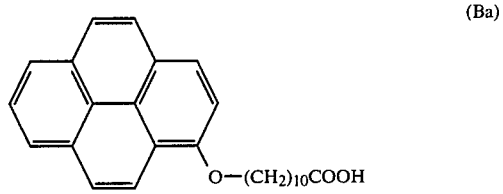

According to the same manner as described above, a new functional monomolecular film or new monomolecular built up films of 5, 10 and 15 layers thereof were formed on the already formed monomolecular film or the built-up films thereof.

A back electrode was formed on the substrate having a thin film which was formed as mentioned above by the following procedure: The substrate was placed in a vapor-depositing chamber; an inner pressure of the chamber was reduced to $10^{-6}$ Torr once; and then while regulating the pressure to $10^{-5}$ Torr, aluminum was vapor-deposited on the substrate at a vapor-depositing rate of 20 Å/sec. to the thickness of 1500 Å.

Figure 5:
FIG. 5 schematically shows a cross section of an EL device according to the present invention.

As shown in FIG. 5, the electroluminescent device thus prepared was sealed with sealing-glasses. Then, according to a conventional manner, silicon oil which was refined, deaerated and dehydrated was injected into a space between the electroluminescent device and the sealing-glass, to provide four electrolumimescent cells of the present invention. These electroluminescent cells were impressed with alternating voltage of 10 V, 400 Hz to give electroluminescences having characteristic colours of the colouring compound. The results of evaluation are shown in Table 1a.

The electroluminescent devices of the present invention as described above had low drive voltages and excellent luminance characteristics as compared with a conventional electroluminescent device of which luminescent matrix was ZnS.

EXAMPLE 2a

Repeating the procedure of Example 1a, an electroluminescent device having pure hetero built-up films as a luminescent layer which were made of respective monomolecular films of the following compounds (Ca) and (Da) were prepared. The results of evaluation are shown in Table 1a.

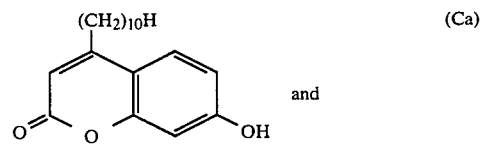

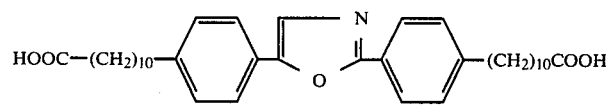
(Da)

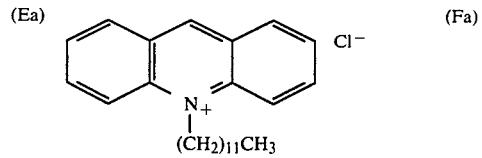
(Ea)     (Fa)

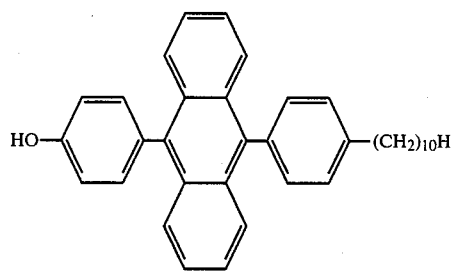

COMPARATIVE EXAMPLE 1a

Repeating the procedure of Example 1a except that a compound (Ba) alone was employed as a luminescent compound and a luminescent layer was a monolayer, a comparative electroluminescent device was prepared and evaluated similarly as in Example 1a. The results of evaluation are shown in Table 1a.

COMPARATIVE EXAMPLE 2a

Repeating the procedure of Example 2a except that a compound (Da) alone was employed as a luminescent compound and a luminescent layer was a monolayer, a comparative electroluminescent device was prepared and evaluated similarly as in Example 2a. The results of evaluation are shown in Table 1a.

TABLE 1a

| Degree of Built-up | | | | |
| --- | --- | --- | --- | --- |
| First layer | Second layer | Drive Voltage | Luminance (fL) | Current Density (mA/cm²) |
| Example 1a | | | | |
| 1 | 1 | 5 V, 400 Hz | 1.5 | 0.6 |
| 5 | 5 | 10 V, 400 Hz | 12 | 0.15 |
| 10 | 10 | 10 V, 400 Hz | 18 | 0.1 |
| 15 | 15 | 10 V, 400 Hz | 16 | 0.09 |
| Example 2a | | | | |
| 1 | 1 | 5 V, 400 Hz | 1.6 | 0.5 |
| 5 | 5 | 10 V, 400 Hz | 16 | 0.14 |
| 10 | 10 | 10 V, 400 Hz | 19 | 0.1 |
| 15 | 15 | 10 V, 400 Hz | 16 | 0.08 |
| Comparative Example 1a | | | | |
| | 2 | 5 V, 400 Hz | 1 or less | |
| | 10 | 10 V, 400 Hz | " | |
| | 20 | 10 V, 400 Hz | " | |
| | 30 | 10 V, 400 Hz | " | |
| Comparative Example 2a | | | | |
| | 2 | 5 V, 400 Hz | 1 or less | |
| | 10 | 10 V, 400 Hz | " | |
| | 20 | 10 V, 400 Hz | " | |
| | 30 | 10 V, 400 Hz | " | |

EXAMPLE 3a

Repeating the procedure of Example 1a except for employing the following compounds (Ea) and (Fa) in place of compounds (Aa) and (Ba), an electroluminescent device of the present invention was prepared with the proviso that each built-up film was made of 10 layers, and evaluated under the same condition as in Example 1a. As the result, the luminance was 18 fL when the current density was 0.09 mA/cm².

EXAMPLE 1b

A transparent electrode was formed by vapor-depositing an ITO layer of 1500 Å thick on a glass plate of 50 mm square according to the sputtering method. After the resulting substrate was cleaned sufficiently, it was dipped into an aqueous phase (pH 6.5) in Langmuir-Trough 4 (produced by Joyce-Loebel Co. Ltd.) in which the concentration of potassium iodide was $4 \times 10^{-4}$M.

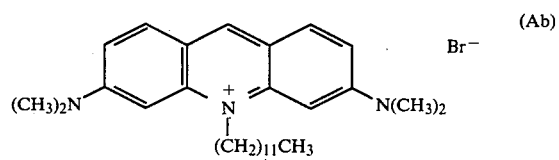
(Ab)

The above compound (Ab) was dissolved in chloroform ($10^{-3}$mol/l), and the solution was spread on the surface of the aqueous phase described above.

After removal of chloroform by evaporation, the surface pressure was raised to 30 dynes/cm, and the monomolecular film of the above-mentioned colouring compound was formed. Then, while keeping the surface pressure constant, the substrate was carefully immersed and pulled up (a rate of moving vertically was 2 cm/min.) at right angle to the surface of the aqueous phase, and whereby the monomolecular film of the colouring compound was transferred onto the substrate. By repeating the operation, a monomolecular built-up film of 6 layers of the monomolecular film were formed. In this building up step, the substrate, after each uptake from the aqueous phase, was left standing for 30 minutes or more to remove the adherent water therefrom by evaporation.

Next, by use of an electric resistance heating vapor-deposition apparatus, anthracene (Bb) was vapor-deposited in the thickness of 500 Å, on the transparent electrode plate provided with the above-mentioned monomolecular built-up film according to the following procedure:

An inner pressure of the chamber was reduced to $10^{-6}$ Torr once; the temperature of the electric resistance heating boat (Mo) was raised slowly, and a current flowing through the boat containing anthracene was controlled so that the vapor-deposition rate was 5 Å/sec. The vacuum pressure was $9 \times 10^{-6}$ Torr while vapor-depositing, and the temperature of the substrate holder was also kept constant by circulating water whose temperature was 20° C.

Finally, a back electrode was formed on the substrate having a thin film which was formed as mentioned above by the following procedure:

The substrate was placed in a vapor-depositing chamber, the inner pressure of the chamber was reduced to $10^{-6}$ Torr once, and then while regulating the pressure to $10^{-5}$ Torr, aluminum was vapor-deposited on the substrate at a vapor-depositing rate of 20 Å/sec. in the thickness of 1500 Å.

As shown in FIG. 5, the electroluminescent device prepared was sealed with sealing-glasses. Then, according to a conventional manner, silicon oil which was refined, deaerated and dehydrated was injected into a space between the electroluminescent device and the sealing-glass, to provide four electroluminescent cells of the present invention. These electroluminescent cells were impressed with alternating voltage of 10 V, 400 Hz to give electroluminescences. The luminance was 15 fL at a current density of 0.09 mA/cm$^2$.

The electroluminescent devices of the present invention as described above had low drive voltages and excellent luminance characteristics as compared with a conventional electroluminescent device whose luminescent matrix was ZnS.

COMPARATIVE EXAMPLE 1b

Repeating the procedure of Example 1b except that the second layer was not formed, a comparative electroluminescent device was prepared and evaluated similarly as in Example 1b. As the result, the luminance was 1 fL or less at a current density of 0.2 mA/cm$^2$.

EXAMPLE 2b

Repeating the procedure of Example 1b except for employing the following compounds (Cb) and (Db) in place of compounds (Ab) and (Bb), an electroluminescent device of the present invention was prepared with the proviso that each built-up film was made of 6 layers, and evaluated under the same condition as in Example 1b. As a result, the luminance was 18 fL when a density of current was 0.11 mA/cm$^2$.

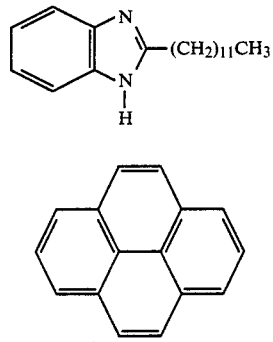

Cb

Db

EXAMPLE 1c

A transparent electrode was formed by vapor-depositing an ITO layer of 1500 Å thick on a glass plate of 50 mm square according to a sputtering method.

Next, by use of an electric resistance heating vapor-deposition apparatus, imidazole (Ac) was vapor-deposited in the thickness of 500 Å on the transparent electrode plate provided with the above-mentioned monomolecular built-up film according to the following manner: An inner pressure of the chamber was reduced to $10^{-6}$ Torr once; the temperature of the electric resistance heating boat (Mo) was raised slowly, and a current was controlled which was flowing through the boat in which imidazole was charged, so that the vapor deposition rate was 5 Å/sec; the vacuum pressure was $9 \times 10^{-6}$ Torr while vapor-depositing, and the temperature of the substrate holder was also kept constant by circulating water the temperature of which was 20° C.

Next, the following compounds (Bc) and (Cc) were dissolved in chloroform ($10^{-3}$ mole/l at the mole ratio of 1:1, and the solution was spread on a surface of an aqueous phase (pH 6.5) in Langmuir-Trough 4 (produced by Joyce-Loebel Co. Ltd.) in which a concentration of cadmium chloride was $4 \times 10^{-4}$M.

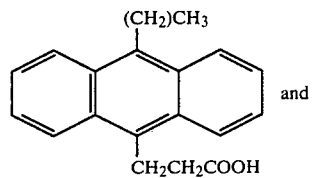

Bc and

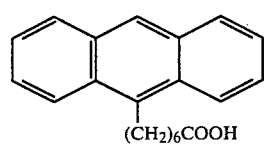

Cc

After removal of chloroform by evaporation, the surface pressure was raised to 30 dynes/cm, and the monomolecular film of mixed molecules of the above-mentioned compounds was formed. Then, while keeping the surface pressure constant, the substrate was carefully immersed and pulled up (a rate of moving vertically was 2 cm/min.) at right angle to the surface of the aqueous phase, and whereby the monomolecular film of the mixed molecules was transferred onto the substrate. By repeating the operation, the mixed monomolecular built-up film of 6 layers of the mixed molecules were formed.

In this building up step, the substrate, after each uptake from the aqueous phase, was allowed to stand for 30 minutes or more to remove the adherent water therefrom by evaporation.

Finally, a back electrode was formed on the substrate having a thin film which was formed as mentioned above by the following procedure: The substrate was placed into a vapor-depositing chamber; an inner pressure of the chamber was reduced to $10^{-6}$ Torr once; and then while regulating the pressure to $10^{-5}$ Torr, aluminum was vapor-deposited on the substrate at 20 Å/sec. of a vapor-depositing rate in the thickness of 1500 Å.

As shown in FIG. 5, the electroluminescent device thus prepared was sealed with sealing-glasses. Then, according to a conventional manner, silicone oil which was refined, deaerated and dehydrated was injected into a space between the electroluminescent device and the sealing-glass, to provide an electroluminescent cell of the present invention. These electroluminescent cells were impressed with alternating voltage of 10 V, 400 Hz to give a electroluminescence. The luminance was 16 fL at a current density of 0.09 mA/cm$^2$.

The electroluminescent devices of the present invention as described above had low drive voltages and excellent luminance characteristics as compared with a conventional electroluminescent device of which luminescent matrix was ZnS.

COMPARATIVE EXAMPLE 1c

Repeating the procedure in Example 1c except that no first layer was formed, a comparative electroluminescent device was prepared and evaluated similarly as in Example 1c. As the result, the luminance was 1 fL or less at a current density of 0.1 mA/cm$^2$.

EXAMPLE 2c

Repeating the procedure of Example 1c except for employing the following compounds (Ec) in place of (Ac) and (Fc) in place of (Bc) and (Cc), an electroluminescent device of the present invention was prepared with the proviso that each built-up film was made of 6 layers, and evaluated under the same condition as in Example 1c. As a result, the luminance was 34 fL when a density of current was 0.11 mA/cm$^2$.

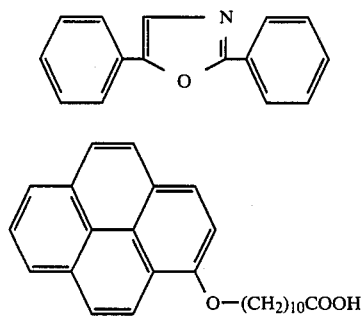

Ec

Fc

O—(CH$_2$)$_{10}$COOH

What is claimed is:

1. An electroluminescent device which comprises a luminescent layer of a double layer structure and a pair of electrodes between which the luminescent layer is sandwiched, a first layer in the double layer structure having a monomolecular film or a monomolecular layer built-up film comprising at least one electroluminescent organic compound which is electron-acceptable relative to a second layer in the double layer structure, and the second layer having a monomolecular film or a monomolecular layer built-up film comprising at least one electroluminescent organic compound which is electron-donative relative to the first layer.

2. An electroluminescent device according to claim 1, wherein at least one of the pair of electrodes is transparent.

3. An electroluminescent device according to claim 2, wherein the first layer faces on a transparent electrode.

4. An electroluminescent device according to claim 1, wherein the electroluminescent organic compound has a high luminescent quantum efficiency and $\pi$ electron system susceptible to external perturbation and can be excited by electric field.

5. An electroluminescent device according to claim 1, wherein said electroluminescent organic compound is represented by the formula:

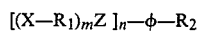

[(X—R$_1$)$_m$Z]$_n$—$\phi$—R$_2$ wherein X and R$_2$ each represent hydrogen, halogen, an alkoxy group, an alkyl ether group, a nitro group; a carboxyl group, a sulfonic acid group, a phosphoric acid group, a silicic acid group, a primary to tertiary amino group, and a metal salt thereof, a primary to tertiary amine salt thereof or an acid salt thereof; an ester group, a sulfamide group, an amide group, an imino group, a quaternary amino group and a salt thereof, a hydroxyl group; R$_1$ represents a C$_4$–C$_{30}$ alkyl group; m is 1 or 2; n is an integer of 1 to 4; Z is a direct bond or —O—, —S—, —NR$_3$—, —CH$_2$NR$_3$—, —SO$_2$N-R$_3$—, —CO—, —COO— (R$_3$ is hydrogen, an alkyl group or an aryl group); and $\phi$ is a fused polycyclic aromatic hydrocarbon, p-terphenyl, 2,5-diphenyloxazole, 1,4-bis(2-methylstyryl)-benzene, xanthine, coumarin, acridine, cyanine dye, benzophenone, phthalocyanine and a metal complex thereof, porphyrin and a metal complex thereof, 8-hydroxyquinoline and a metal complex thereof, an organic ruthenium complex, an organic rare earth complex, and a derivative of these compounds, a heterocyclic compound and a derivative thereof, an aromatic polyamine, a compound having quinone structure, tetracyanoquinodimethane and tetracyanoethylene.

6. An electroluminescent device according to claim 1, wherein the built-up number of monomolecular films is 2 to 400 in total number of the two layers.

7. An electroluminescent device according to claim 1, wherein the built-up number of monomolecular films is 4 to 400 in total number of the two layers.

8. An electroluminescent device according to claim 1, wherein the luminescent layer has a thickness of 0.01 to 1 $\mu$m.

9. An electroluminescent device which comprises a luminescent layer of a double layer structure and a pair of electrodes between which the luminescent layer is sandwiched, a first layer in the double layer structure having a monomolecular film or a monomolecular layer built-up film comprising at least one electroluminescent organic compound which is electron-acceptable relative to a second layer in the double layer structure, and the second layer having a molecular deposited film comprising at least one electroluminescent organic compound which is electron-donative relative to the first layer.

10. An electroluminescent device according to claim 9, wherein at least one of the pair of electrodes is transparent.

11. An electroluminescent device according to claim 10, wherein the first layer faces on a transparent electrode.

12. An electroluminescent device according to claim 9, wherein the electroluminescent organic compound has a high luminescent quantum efficiency and $\pi$ electron system susceptible to external perturbation and can be excited by electric field.

13. An electroluminescent device according to claim 9, wherein said electroluminescent organic compound is represented by the formula:

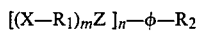

[(X—R$_1$)$_m$Z]$_n$—$\phi$—R$_2$ wherein X and R$_2$ each represent hydrogen, halogen, an alkoxy group, an alkyl ether group, a nitro group; a carboxyl group, a sulfonic acid group, a phosphoric acid group, a silicic acid group, a primary to tertiary amino group, and a metal salt thereof, a primary to tertiary amine salt thereof or an acid salt thereof; an ester group, a sulfamide group, an amide group, an imino group, a quaternary amino group and a salt thereof, a hydroxyl group; R$_1$ represents a C$_4$–C$_{30}$ alkyl group; m is 1 or 2; n is an integer of 1 to 4; Z is a direct bond or —O—, —S—, —NR$_3$—, —CH$_2$NR$_3$—, —SO$_2$N-R$_3$—, —CO—, —COO— (R$_3$ is hydrogen, an alkyl group or an aryl group); and $\phi$ is a fused polycyclic aromatic hydrocarbon, p-terphenyl, 2,5- diphenyloxazole, 1,4-bis(2-methylstyryl)-benzene, xanthine, coumarin, acridine, cyanine dye, benzophenone, phthalocyanine and a metal complex thereof, porphyrin and a metal complex thereof, 8-hydroxyquinoline and a metal complex thereof, an organic ruthenium complex, an organic rare earth complex, and a derivative of these compounds, a heterocyclic compound and a derivative thereof, an aromatic polyamine, a compound having quinone structure, tetracyanoquinodimethane and tetracyanoethylene.

14. An electroluminescent device according to claim 9, wherein the built-up number of monomolecular films is 1 to 200 in total number of the two layers.

15. An electroluminescent device according to claim 9, wherein the built-up number of monomolecular films is 4 to 200 in total number of the two layers.

16. An electroluminescent device according to claim 9, wherein the whole luminescent layer has a thickness of 0.01 to 1 μm.

17. An electroluminescent device according to claim 9, wherein the second luminescent layer has a thickness of 0.01 to 0.5 μm.

18. An electroluminescent device according to claim 9, wherein the whole luminescent layer has a thickness of 0.02 to 1 μm.

19. An electroluminescent device which comprises a luminescent layer of a double layer structure and a pair of electrodes between which the luminescent layer is sandwiched, a first layer in the double layer structure having a molecular deposited film comprising at least one electroluminescent organic compound which is electron-acceptable relative to a second layer in the double layer structure, and the second layer having a monomolecular film or a monomolecular layer built-up film comprising at least one electroluminescent organic compound which is electron-donative relative to the first layer.

20. An electroluminescent device according to claim 19, wherein at least one of the pair of electrodes is transparent.

21. An electroluminescent device according to claim 20, wherein the first layer faces on a transparent electrode.

22. An electroluminescent device according to claim 19, wherein the electroluminescent organic compound has a high luminescent quantum efficiency and electron system susceptible to external perturbation and can be excited by electric field.

23. An electroluminescent device according to claim 19, wherein said electroluminescent organic compound is represented by the formula:

$$[(X-R_1)_m Z]_n - \phi - R_2$$

wherein X and $R_2$ each represent hydrogen, halogen, an alkoxy group, an alkyl ether group, a nitro group; a carboxyl group, a sulfonic acid group, a phosphoric acid group, a silicic acid group, a primary to tertiary amino group, and a metal salt thereof, a primary to tertiary amine salt thereof or an acid salt thereof; an ester group, a sulfamide group, an amide group, an imino group, a quaternary amino group and a salt thereof, a hydroxyl group; $R_1$ represents a $C_4 - C_{30}$ alkyl group; m is 1 or 2; n is an integer of 1 to 4; Z is a direct bond or $-O-$, $-S-$, $-NR_3-$, $-CH_2NR_3-$, $-SO_2NR_3-$, $-CO-$, $'COO-$ ($R_3$ is hydrogen, an alkyl group or an aryl group); and $\phi$ is a fused polycyclic aromatic hydrocarbon, p-terphenyl, 2,5-diphenyloxazole, 1,4-bis(2-methylstyryl)-benzene, xanthine, coumarin, acridine, cyanine dye, benzophenone, phthalocyanine and a metal complex thereof, porphyrin and a metal complex thereof, 8-hydroxyquinoline and a metal complex thereof, an organic ruthenium complex, an organic rare earth complex, and a derivative of these compounds, a heterocyclic compound and a derivative thereof, an aromatic polyamine, a compound having quinone structure, tetracyanoquinodimethane and tetracyanoethylene.

24. An electroluminescent device according to claim 19, wherein the luminescent layer has a thickness of 0.01 to 0.05 μm.

25. An electroluminescent device according to claim 19, wherein the built-up number of monomolecular films is to 200 in total number of the two layers.

26. An electroluminescent device according to claim 19, wherein the built-up number of monomolecular films is 1 4 to 200 in total number of the two layers.

27. An electroluminescent device according to claim 19, wherein the whole luminescent layer has a thickness of 0.01 to 1 μm.

28. An electroluminescent device according to claim 19, wherein the whole luminescent layer has a thickness of 0.02 to 1 μm.

* * * * *

UNITED STATES PATENT AND TRADEMARK OFFICE
CERTIFICATE OF CORRECTION

PATENT NO. : 4,672,265

DATED : June 9, 1987

INVENTOR(S) : KEN EGUCHI, ET AL.

It is certified that error appears in the above-identified patent and that said Letters Patent is hereby corrected as shown below:

COLUMN 1

Line 36, "tens fraction" should read --tenths--.
Line 57, "EC" should read --EL--.

COLUMN 3

Line 16, "8hydroxyquinoline" should read --8-hydroxyquinoline--.
Line 42, "halo" should read --halogen--.
Line 53, "-O-," should read -- -O-, -S-,--.

COLUMN 9

Line 53, "layers" should read --layer--.
Line 64, "like of" should read --like,--.

COLUMN 10

Line 2, "and" should read --as--.
Line 9, "with" should be deleted.

COLUMN 11

Line 46, "resistanceheating" should read --resistance-heating--.

COLUMN 13

Line 63, "E" should read --The EL--.

UNITED STATES PATENT AND TRADEMARK OFFICE
CERTIFICATE OF CORRECTION

PATENT NO. : 4,672,265
DATED : June 9, 1987
INVENTOR(S) : KEN EGUCHI, ET AL.

It is certified that error appears in the above-identified patent and that said Letters Patent is hereby corrected as shown below:

COLUMN 14

Line 16, "a" should read --the--.

COLUMN 15

Line 3, "a suitable kind" should read --suitable kinds--.
Line 10, "the" should read --this--.
Line 12, "-resistance" should read -- -resistant--.
Line 63, "on" should read --onto--.

COLUMN 16

Line 28, "-depositing" should read -- -deposition--.

COLUMN 17

Line 2, "(Da)" should be deleted.
Line 11, --(Da)-- should be inserted alongside second formula.

COLUMN 18

Line 66, " -depositing" should read -- -deposition--.

COLUMN 20 line 4, "mole/1 at" should read --mole/1) at--.
Line 44, " -depositing" should read -- -deposition--.
Line 48, "of a vapor-depositing rate in" should read --(vapor-depositing rate) to--.
Line 58, "a" should be deleted.

UNITED STATES PATENT AND TRADEMARK OFFICE
CERTIFICATE OF CORRECTION

PATENT NO. : 4,672,265

DATED : June 9, 1987

INVENTOR(S) : KEN EGUCHI, ET AL.

It is certified that error appears in the above-identified patent and that said Letters Patent is hereby corrected as shown below:

<u>COLUMN 24</u>

Line 20, ", 'COO-" should read --, -COO- --.
Line 39, "is to" should read --is 1 to--.
Line 42, "is 1 4 to" should read --is 4 to--.

Signed and Sealed this

Twenty-ninth Day of December, 1987

Attest:

DONALD J. QUIGG

*Attesting Officer*          *Commissioner of Patents and Trademarks*